Sept. 15, 1931.

A. F. PYM

RELASTING MACHINE

Re. 18,186

Original Filed Feb. 7, 1921 6 Sheets-Sheet 1

INVENTOR
Arthur F. Pym
By his Attorney
Nelson W. Howard

A. F. PYM

Sept. 15, 1931. RELASTING MACHINE Re. 18,186

Original Filed Feb. 7, 1921 6 Sheets-Sheet 2

A. F. PYM

Sept. 15, 1931. RELASTING MACHINE Re. 18,186

Original Filed Feb. 7, 1921 6 Sheets-Sheet 3

A. F. PYM

Sept. 15, 1931. RELASTING MACHINE Re. 18,186

Original Filed Feb. 7, 1921 6 Sheets-Sheet 5

INVENTOR
Arthur F. Pym
By his Attorney
Nelson M. Howard

A. F. PYM

Sept. 15, 1931. RELASTING MACHINE Re. 18,186

Original Filed Feb. 7, 1921 6 Sheets-Sheet 6

INVENTOR
Arthur F. Pym
By his Attorney,
Nelson W. Hondred

Reissued Sept. 15, 1931 Re. 18,186

UNITED STATES PATENT OFFICE

ARTHUR F. PYM, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

RELASTING MACHINE

Original No. 1,678,164, dated July 24, 1928, Serial No. 443,043, filed February 7, 1921. Application for reissue filed July 12, 1930. Serial No. 467,591.

This invention relates to shoemaking, and is illustrated as embodied in apparatus for mounting shoes on lasts. This operation is of special importance in connection with "relasting" or "second lasting" turn shoes, since it is the relasting that is primarily relied upon to give shoes of that sort their final form. It may be utilized, also, in some of its aspects, in machines for removing shoes from lasts. In various of its aspects, however, the invention is not limited to either of these uses.

According to present practice, shoes are usually relasted by hand, and in turn shoe manufacture especially the operation is very laborious. During the relasting operation, if the heel or shank portion of the shoe is held stationary while the last is forced into the shoe, or if the last is held while the shoe is pulled thereon by means engaging the counter or shank portions or the rear of the sole, the strain longitudinally of the shoe causes a marked narrowing of the forepart of the shoe. As every effort to force the last into the shoe increases this narrowing action, while the proper seating of the last in the shoe involves a broadening of the forepart of the shoe due to the forwardly tapering form of the forward portion of the last, such pulling may produce a relasted shoe which seems very tight on the last so long as tension is maintained but which is found to be loose when the tension is released.

On the other hand, if the shoe is pushed rather than pulled on the last, as occurs in using means engaging the shoe forwardly of the shank, the forward portion of the shoe is broadened as it is pushed on the last, thus permitting easier insertion of the last, and tightening instead of loosening the shoe on the last when the pressure on it is released. The marked difference between pushing and pulling on the shoe may readily be demonstrated by first pulling manually on the counter portion of a shoe, and then pushing on the forward portion. In thus pushing shoes on lasts, it is desirable to vary the power applied to the shoes, as lasts of different shapes and shoes of different materials and under different conditions require different amounts of power. If the force is applied positively, it is difficult to vary its strength, and to stop its application promptly when the last is properly seated in the shoe, so as to avoid unduly straining the toe of the shoe by pushing it against the end of the last.

One object of the present invention is to provide an improved relasting machine the operation of which will overcome the difficulties and avoid the undesirable results above adverted to in connection with relasting operations as they are usually performed.

To the attainment of the above-stated object an important feature of the invention consists in the provision, in a relasting machine, of shoe-pushing means engaging the forward portion of a shoe and comprising an impositively-engaging part, that is to say, a friction surface or a suction member, which will slip when the toe of the last seats in the tip of the shoe, thus suddenly increasing the resistance to the movement of the shoe. In this way the advantages of pushing a shoe on a last are secured, while the friction or suction may be so gaged that the surface will slip as soon as the toe of the last engages the tip of its shoe, thereby avoiding undue strain on the shoe. In the preferred embodiment of the invention illustrated herein, the pushing means is a rotatable shoe-engaging roll, on the surface of which there may be, if desired, suction or vacuum gripping cups.

A still further object of the invention is to improve the seating of the counter portions of shoes on lasts, and in this aspect the invention consists in the provision of novel mechanism for operating a shoe horn in a close imitation of the best manual manipulation of such a horn in relasting the counter portion of the shoe. Further to improve the seating of the counter portion of the shoe, and to co-operate with the means, illustrated as a horn, for drawing this part of the shoe over the last, there is provided means progressively to force the shoe bottom against the last. As illustrated, the shoe-engaging roll which seats the toe portion of the shoe may be moved rearwardly of, and in yielding engagement with, the shoe bottom, to co-operate with the shoe horn in relasting the counter portion of the shoe.

Other features of the invention consist in the provision of an improved last support arranged automatically to withdraw the lasted shoe from the shoe-seating devices, and a novel mounting for the roll such that it may be used to cause relative twisting of the last and shoe.

These and other objects of the invention will be apparent from the following description of the invention in connection with an illustrative machine shown in the appended drawings, in which Figs. 1 to 7 are diagrammatic views illustrating my improved method of mounting a shoe on a last and showing the various positions of the roll and horn of the machine;

Figure 1:
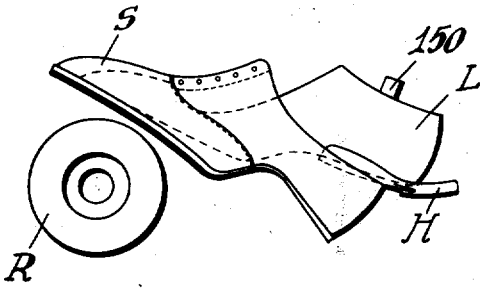
Figure 2:
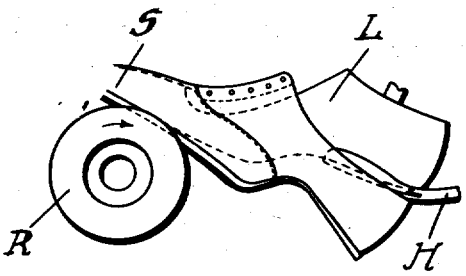
Figure 3:
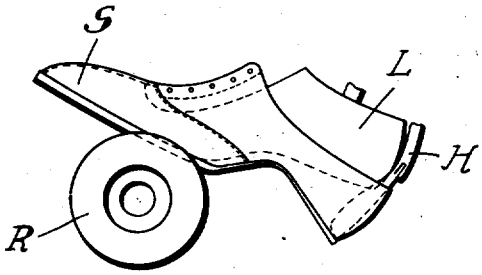
Figure 4:
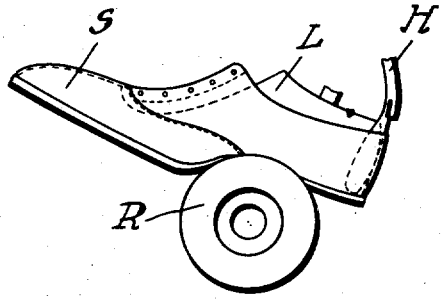
Figure 5:
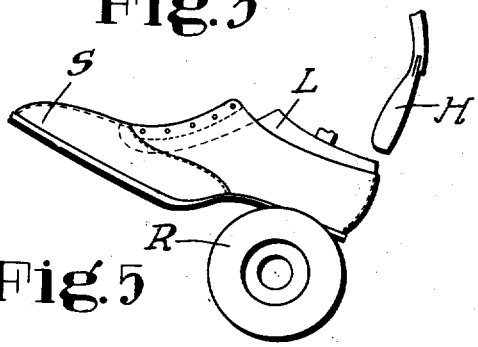
Figure 6:
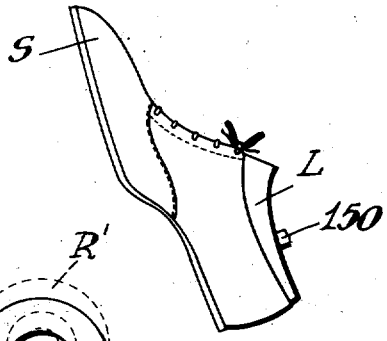
Figure 6:
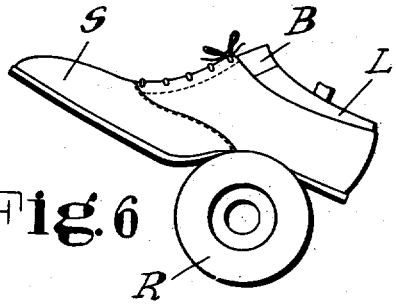
Figure 7:
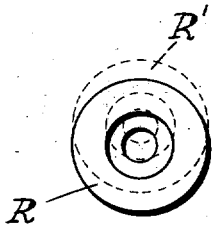
Figure 15:
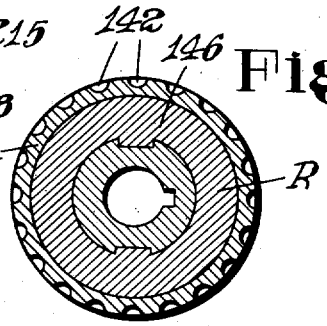
Fig. 15 is a cross-section showing one form of construction of the friction roll.

The improved machine shown in illustrative embodiment in these drawings comprises a friction roll R, which, as hereinafter explained, may be provided with a suction gripping surface in the form of vacuum cups, as shown in Fig. 15, and a shoe horn H, which devices are moved by suitable mechanism hereinafter described to assume various relative positions as shown in Figs. 1 to 7, to mount a shoe on a last. The shoe is partially drawn over the last by hand and the last is mounted on the last pin 150 and swung to the position shown in Figs. 1 and 8. The roll R is then moved upwardly under heavy spring pressure to engage the sole of the shoe at the ball and is positively rotated in a clockwise direction as viewed in Figs. 1 and 2 to seat the toe of the shoe on the toe of the last, pushing the shoe rearwardly on the last to the position shown in Fig. 2. Thereafter the roll, freely rotating on its bearing so that it engages the bottom of the shoe with a rolling friction only, is moved rearwardly as shown in Figs. 3, 4 and 5, while constantly maintained in engagement with the sole by the heavy spring pressure. At the same time the horn H is rocked about the point of the heel of the last to draw the heel portion of the shoe into the position shown in Fig. 3 and thence upwardly about the last as shown in Figs. 4 and 5. The roll is thereafter moved forwardly into the shank of the shoe, being still maintained in engagement with the sole under heavy spring pressure, where it is held to shape the shank against the last while the upper materials are secured about the last, as by lacing (Fig. 6). From this position the roll is moved forwardly and downwardly to starting position while the last pin 150 is turned upwardly to hold the lasted shoe in a convenient position for removal as shown in Fig. 7. This sequence of operations will be discussed in more detail after describing the operating mechanism of the illustrative machine shown in the accompanying drawings.

The machine is enclosed in a suitable casing 20 and is driven by an electric motor 22 which drives worm 24 through a belt 26. Worm 24 meshes with and drives a constantly rotating worm gear 28 to which is secured a gear 30 which meshes with and drives a constantly rotating gear 32.

Figure 8:
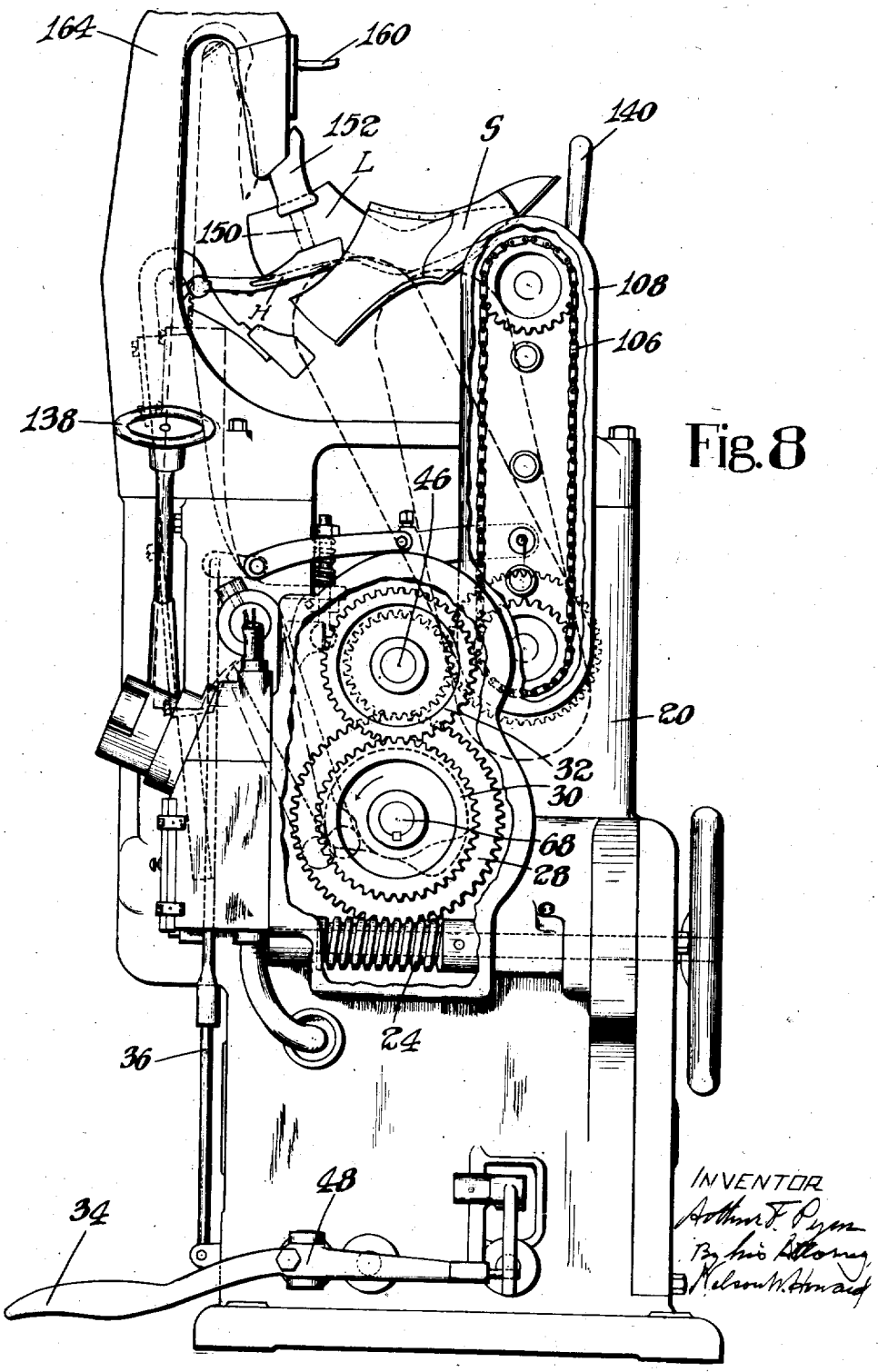
Fig. 8 is a side elevation of the machine in starting position and with parts of the casing broken away to show enclosed mechanism.
Figure 9:
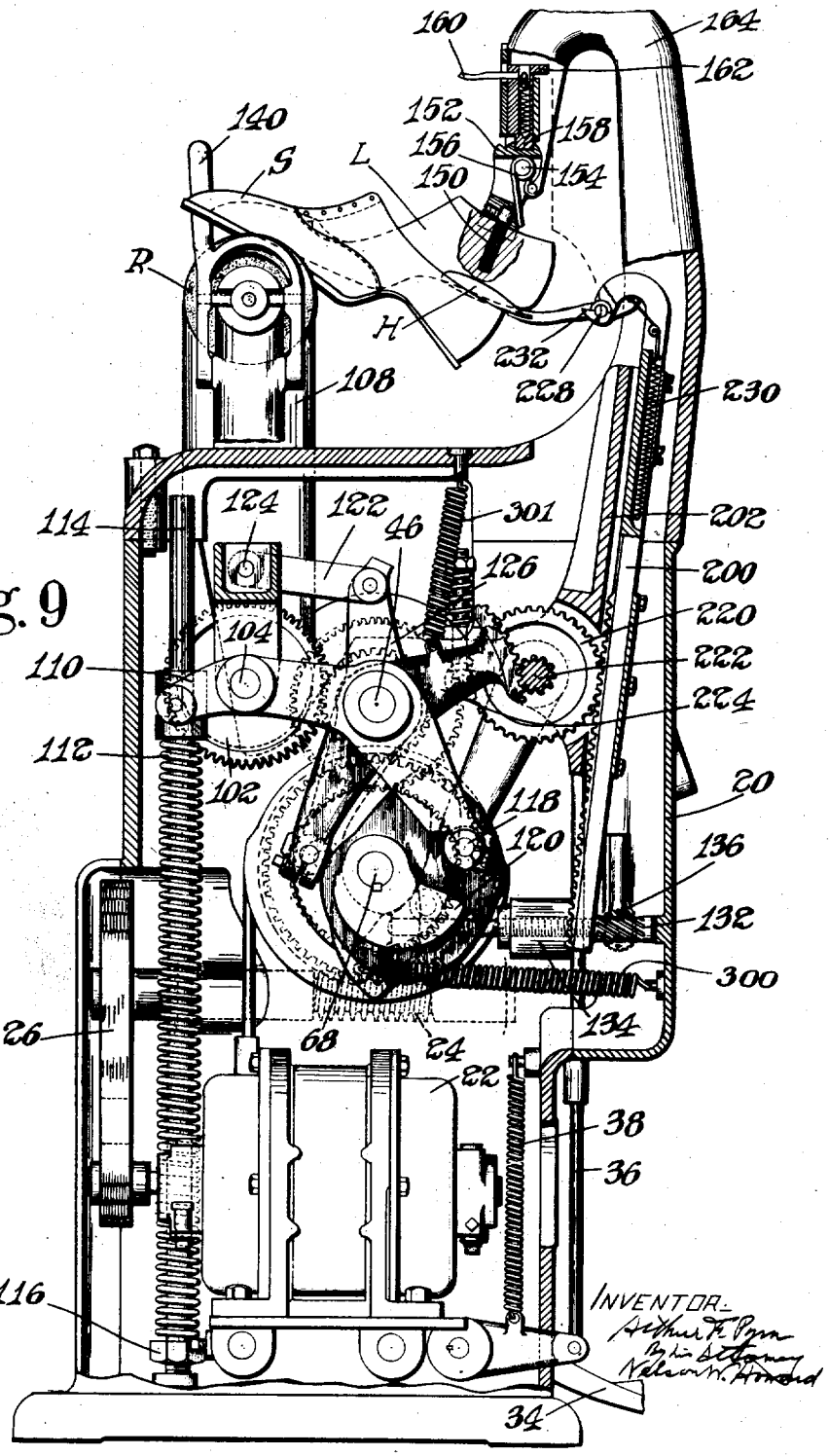
Fig. 9 is a side elevation of the machine from the opposite side from Fig. 8 with the side of the casing removed, this figure showing a modified construction of shoe horn and having the horn-supporting arm broken away to show the horn-actuating mechanism.

Upon depression of a treadle 34 a rod 36 is moved downwardly against the tension of a spring 38 (shown in Fig. 9) to rock a lever 40 (Fig. 11) to pull upwardly on a wedge 42 which throws a suitable clutch 44 against the tension of its enclosed spring. This causes shaft 46 to rotate as long as the treadle 34 is held down. Fixedly mounted on shaft 46 is a pinion 100 which rotates therewith, and, as shown in Figs. 8 and 9, this pinion meshes with a gear 102 on a shaft 104 which, through suitable sprockets and a chain 106, rotates the roll R.

Figure 10:
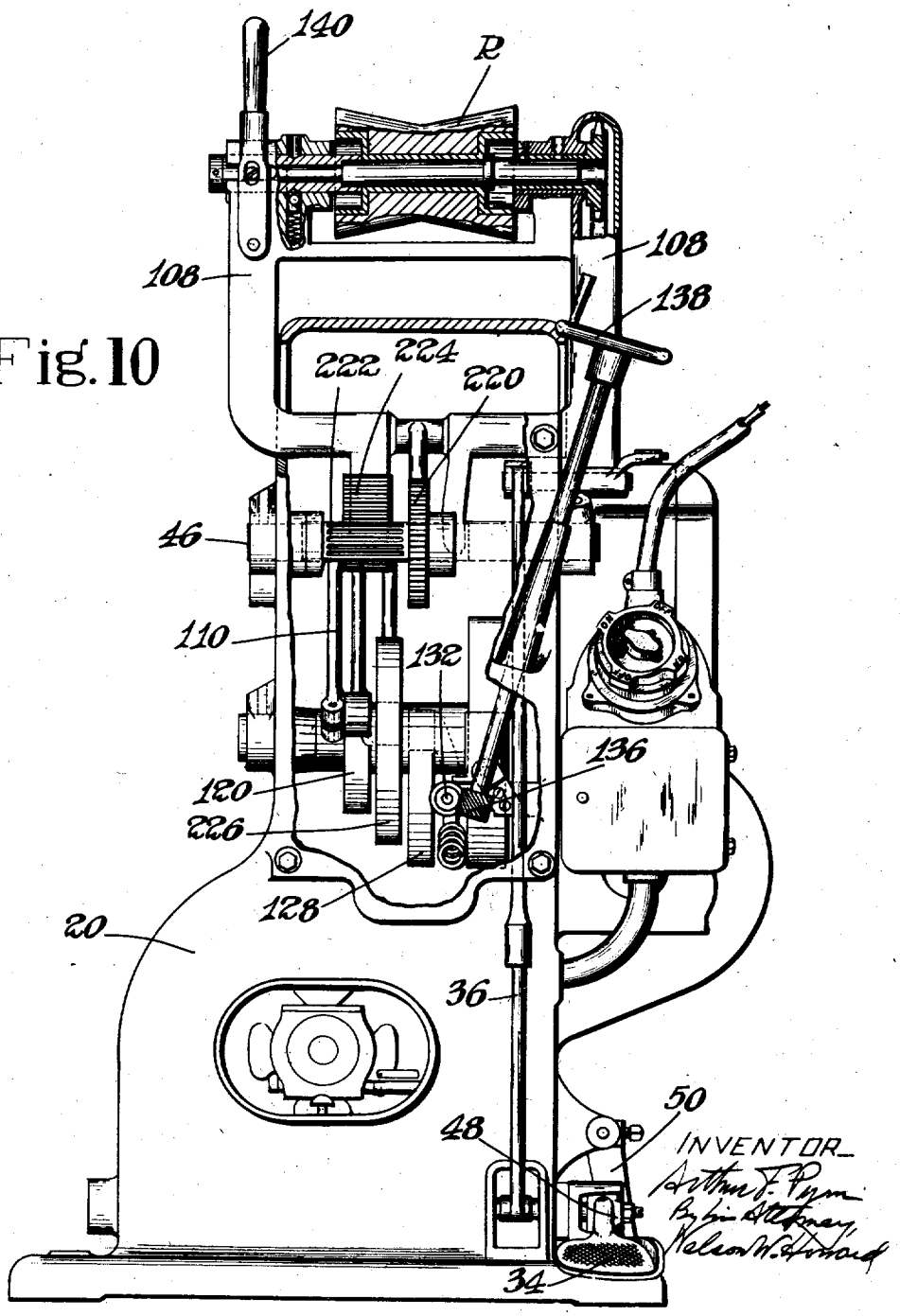
Fig. 10 is a front elevation with the horn support and part of the casing broken away and with the roll shown in section.
Figures 11, 12:
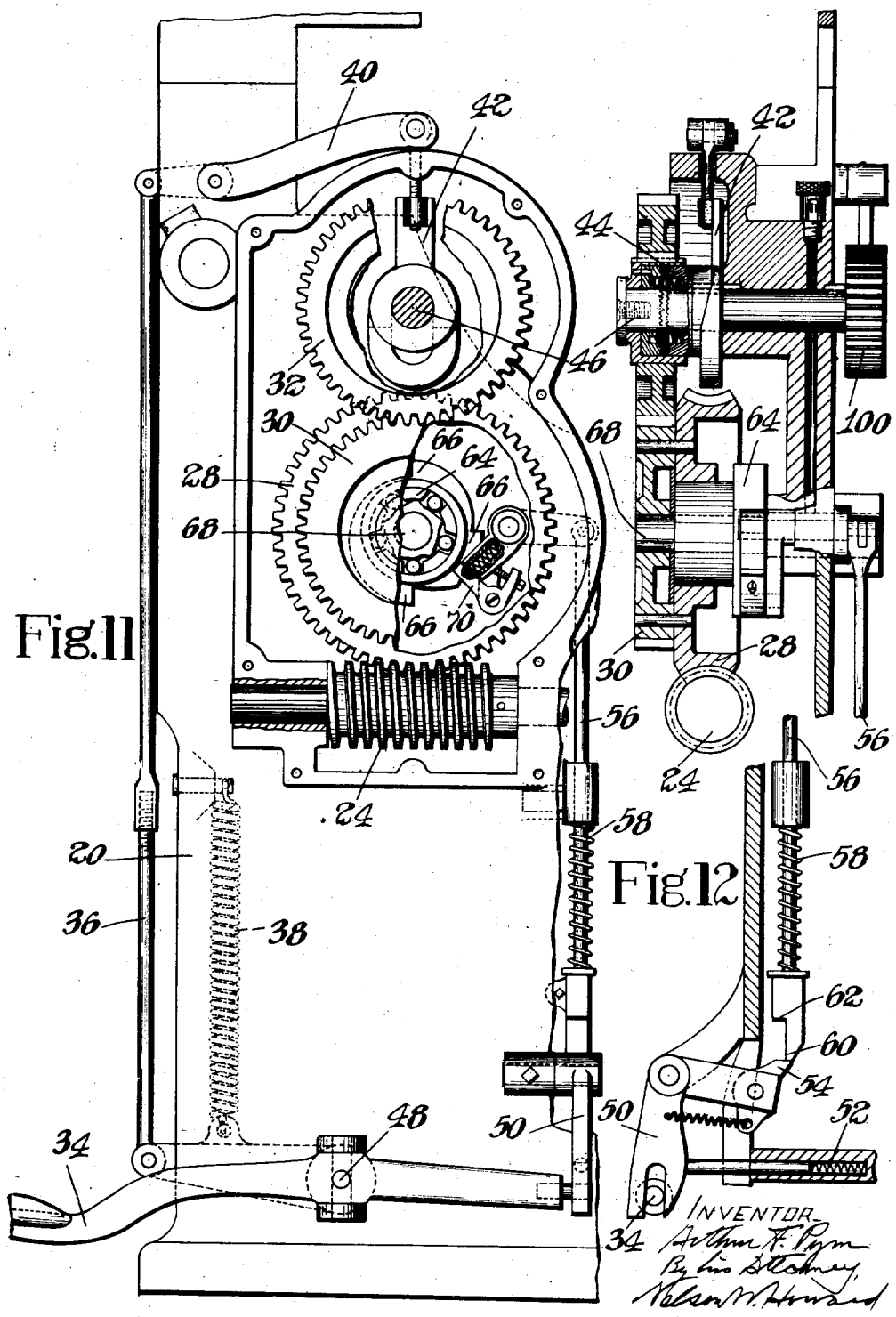
Fig. 11 is an end elevation and Fig. 12 is a sectional view showing the stopping and starting mechanism.
Figure 13:
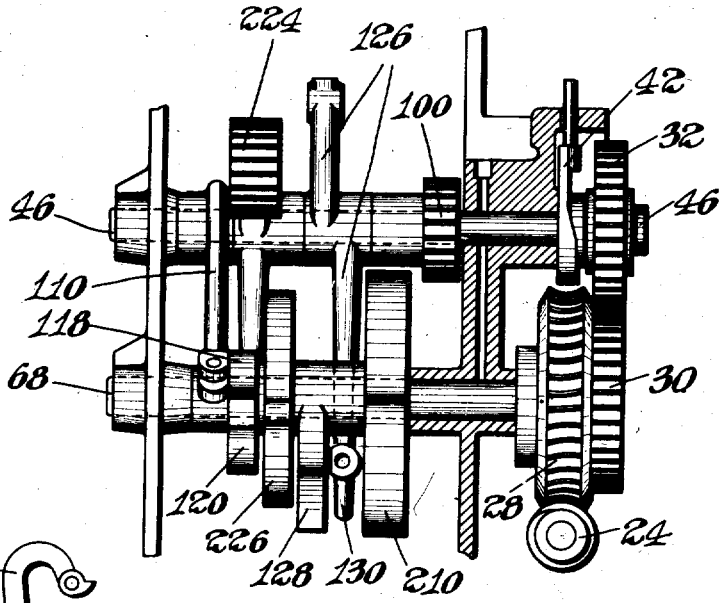
Fig. 13 is a front elevation of the two principal shafts of the machine and the parts mounted thereon.

When the treadle 34 is oscillated to the right in Fig. 10 about pivot 48 it rocks the bell-crank lever 50 in a counterclockwise direction, as viewed in Fig. 12, compressing a spring 52 and moving a pawl 54 upwardly. This pawl forces a rod 56 upwardly against the tension of a spring 58 until the pawl rides off the point 60, whereupon the spring 58 forces rod 56 downwardly again until the abutment 62 seats on the pawl. Upon releasing the treadle, the spring 52 rocks the bell-crank lever 50 in a clockwise direction, as viewed in Fig. 12, causing the pawl 54 to be rocked downwardly to snap beneath the point 60 carried by rod 56. As shown in Fig. 11, when the rod 56 is moved upwardly by the operation of the treadle it trips a Horton clutch 64 which is provided with several abutments 66. This clutch secures together the constantly rotating gear 28 and the shaft 68 during that part of a rotation which serves to bring succeeding abutments 66 in contact with the pawl 70 actuated by the rod 56, as is usual in the operation of a clutch of this type. It will be noted that a complete rotation of shaft 68 is designed to operate the various mechanisms of the machine through one complete cycle, and that the various stops may be positioned so that the machine will stop after each succeeding operation has been fully performed on the shoe, whereupon the operator may again move treadle 34 to trip the clutch for the performance of the next succeeding operation. More or fewer of these abutments 66 may be provided, as desired, fewer stops being needed by the more skillful operatives. Loosely mounted on shaft 46 for rotation relatively thereto is a series of operating devices, and fixedly mounted on shaft 68 is a corresponding series of cams to actuate them in proper sequence. This part of the actuating mechanism is shown in detail in Fig. 13, and partly in dotted lines in Fig. 9.

The frame 108 which carries the roll R is loosely mounted on the shaft 104 which is carried by a bell-crank lever 110. One end of this bell-crank lever is supported by a heavy spring 112 surrounding a rod 114 supported by the casing of the machine. The spring 112 is supported by an adjusting nut 116 in order to permit adjustment of the force which it exerts. This spring 112 is intended to force the roll R upwardly into constant adjustable, yielding engagement with the sole of the shoe being operated upon as shown in Fig. 9, when the bell-crank lever 110 is released.

The lower end of the bell-crank lever 110 bears a cam roll 118 which is arranged to ride on a cam 120 carried by the shaft 68. When this cam 120 engages the cam roll 118 it forces the cam roll upwardly, thereby pulling the shaft 104 and the roll R downwardly while compressing the spring 112. The cam 120 is so constructed and arranged that at the starting position it engages the roll 118 and, therefore, maintains the friction roll R in a lowered position. The first tripping of the Horton clutch rotates the shaft 68 only far enough to release the cam roll 118 from engagement with cam 120, as shown in Fig. 9, and stops before actuating any of the other mechanisms. The roll R is at this time in the position shown in Fig. 9 and in this position it may be rotated by depressing the treadle 34. By the engagement of the roll R with the sole of the shoe the roll pushes the shoe rearwardly to seat the toe portion on the last. Fig. 2 shows the completion of this operation.

During the seating of the counter portion of the shoe on the last, the shoe-engaging roll R is intended to be moved rearwardly to bring the bottom of the shoe progressively against the last under pressure derived from the spring 112, thereby aiding the shoe horn in drawing the counter portion of the shoe over the last. The spring 112 may have a tension of from 200 to 500 pounds, 300 pounds being a suitable tension for ordinary turn shoes, and is designed to lose not more than 15 or 20 pounds of this tension during the upward movement to engage the roll with the bottom of the shoe. A link 122 is secured to the roll-carrying frame 108 on a bearing 124 and is also secured to a bell-crank lever 126 loosely mounted on the shaft 46. The opposite end of the bell-crank lever 126 bears a cam roll which contacts with a cam 128 fixedly mounted on the shaft 68 to rock the bell-crank lever 126 to oscillate the frame 108 to the right in Fig. 9. As it is desired to be able to adjust the extent to which the shoe-engaging roll R moves to the left in Fig. 9, the extreme end 130 (Fig. 13) of the lever 126 is designed to contact with an adjustable abutment 132 as shown in dotted lines in Fig. 9. The adjustable abutment 132 is threaded through a portion 134 of the casing of the machine and can be rotated by a gear 136 actuated by a rotatable handle 138 (Fig. 10). By adjusting the abutment 132 further to the left in Fig. 9 the initial position of the friction roll R is moved to the right in the same figure. The abutment engages the end 130 of the bell-crank lever 126 and prevents the roll carried by this lever from following the cam 128, which would otherwise permit it to rock further. Bell-crank lever 126 is biased counterclockwise (as viewed in Fig. 9) by a spring 300 secured to the frame of the machine, to maintain engagement with cam 128 or with abutment 132, as the case may be.

In most lasts what might be regarded as the longitudinal median line of the toe portion of the last bottom is disposed at more or less of an angle to the longitudinal median line of the heel portion of the last bottom. This crooked or laterally offset relation of the toe and heel portions of the last is commonly referred to as the "swing" of the last. In seating certain kinds of shoes, particularly those which are to be mounted on very narrow and crooked lasts, it is desirable to move one side of the shoe rearwardly of the last more rapidly than the other side, thereby twisting the shoe relative to the last. As shown in Fig. 10, this is accomplished by the use of a concave roll R which may be moved axially by a hand lever 140 while the roll R is rotating, to seat the toe portion of a shoe on the last. While the angular movement of all parts of the roll R is the same, it will be evident that the linear movement of an article engaging the higher part of the roll will be greater than that of an article engaging the lower part. In general, the last is forced against that side of the shoe which has the slower rearward movement; that is, the last is crowded relatively in the direction in which the handle 140 is moved. The best line in a shoe is secured when the last is crowded toward the inner side of the shoe, and, therefore, the handle will usually be moved in the direction of the inner side. This brings a thicker portion of the roll R into engagement with the outer side of the shoe, moving the outer side rearwardly faster than the inner side. Such manipulation of the roll R serves to vary the direction of relative movement between the shoe and the last at the heel end of the shoe, under control of the operator, to accommodate variations in the swing of different lasts. The twisting so produced crowds the last firmly against the inner side of the shoe, securing a fineness of line heretofore obtainable only by manipulation of the shoe with a shoe hammer subsequent to the relasting operation.

One form of construction of the roll is shown in Fig. 15. According to this construction, the surface of the roll is formed with vacuum cups 142 which, when pressed against the sole, adhere thereto by suction, the adhesion being dependent upon the degree of pressure between the roll and the shoe bottom. The roll is formed with a wear-resisting surface 144, such as rubber and canvas, which will not develop excessive friction against the shoe bottom and in which are formed the vacuum cups 142, beneath which is a highly resilient layer 146 which is illustrated as being made of sponge rubber, but which might readily be made in the form of a pneumatic or other cushion.

A last pin 150, adapted to fit within the usual thimble hole of a last, is mounted in a support 152 to oscillate about a pivotal mounting 154. A spring 156 constantly urges the support 152 into the position shown in Fig. 7. A latch 158 is spring-pressed into engagement with the support 152 to hold it either in the position shown in Fig. 7 or in the position shown in Fig. 9. The latch 158 bears two abutments 160, 162, and pressing upward on either of these abutments releases the latch and allows the spring 156 to turn the last pin support from the position shown in Fig. 9 to the position shown in Fig. 7. The abutment 160 is mounted for manual releasing of the latch, which may at times be desirable quickly to withdraw the last from the shoe-seating devices, to avoid injury or marring of the shoe. The abutment 162 is arranged to be engaged by an abutment carried by the reciprocating shoe horn support as hereinafter explained. The last pin support is carried by a curved neck 164 which is high enough so that the upper of a high shoe may be received therein. This curved neck also protects the shoe horn and its reciprocating support, which move inside thereof.

Figure 14:
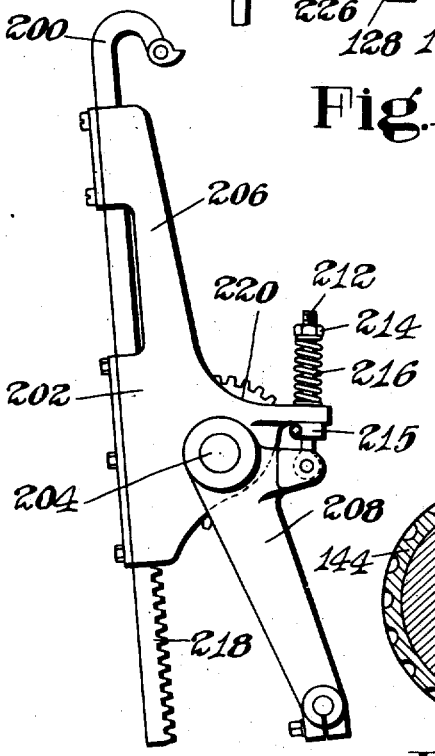
Fig. 14 is a detail view of the horn-actuating support shown in side elevation from the opposite side from Fig. 9.

The shoe horn H is pivotally mounted on a reciprocating support 200 which is carried by an oscillating bell-crank lever 202 (Fig. 14) mounted on a bearing 204. The bell-crank lever 202 is made up of two arms, the arm 206 carrying the reciprocating support 200 and the arm 208 carrying a cam roll arranged to engage the cam 210 (Fig. 13) to oscillate the bell-crank lever about the pivotal bearing 204. The two arms 206 and 208 are connected by a rod 212 carried by the arm 208 and the rod 212 carries an adjustable abutment 214 bearing against a spring 216 which engages a projection on the arm 206. This provides for yielding oscillation of the arm 206. A second adjustable abutment 215 makes possible a variation in the initial relative position of the arms 206 and 208, by crowding the arm 206 upwardly against the spring 216. Mounted on the bearing 204, in engagement with a rack surface 218 on the shoe horn support 200, is a gear 220 (Fig. 9). This gear 220 is rotated by a pinion 222 which is rocked by the oscillation of a bell-crank lever 224 (Figs. 9 and 13), to reciprocate the support 200. The bell-crank lever 224 is oscillated at the proper time by a cam 226 on the shaft 68. The horn H is attached to the support 200 on a bearing 228 and is urged by the tension of a spring 230 into engagement with the last bottom, as shown in Fig. 9. The support 200 also carries an abutment 232 constructed and arranged to engage the abutment 162 of the latch for the last pin to release the last pin at the end of the cycle of the machine. Bell-crank lever 224 is biased counterclockwise by a spring 301 to maintain engagement with cam 226.

Figure 16:
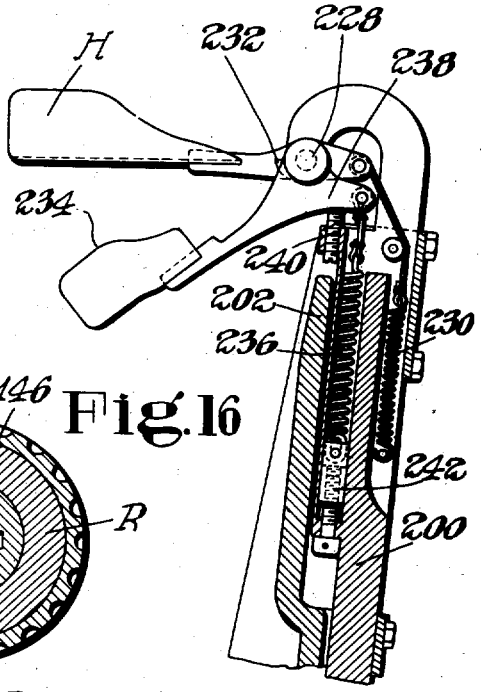
Fig. 16 is a detail view showing an alternative form of shoe horn.

A preferred construction of the shoe horn is shown in detail in Fig. 16, and is also indicated in Fig. 8. In this form a second member 234 is mounted on the bearing 228 to form with the horn H a jaw to grip the counter portion of the shoe. This member 234 is urged into engagement with the shoe horn H by a spring 236 and said member is in the form of a bell-crank lever of which one end 238, on the downward movement of the shoe horn at the end of the cycle, will engage an adjustable stop 240 which causes the opening of the jaw for the insertion of the next shoe. The jaw automatically closes during the very first part of the upward movement of the shoe horn support. It will be observed that the tension of spring 236 may be adjusted by means shown at 242 to avoid sufficient pressure to injure any of the various kinds of shoes.

It will be observed that by the illustrative preferred construction of the machine, the shoe is held in such a way that there are no obstructions to interfere with the operative in guiding it and in operating on it in the usual way with a shoe hammer. This is much facilitated by holding the shoe right-side up, as shown.

In operation, at the beginning of the cycle of the machine the last pin 150 is in the position shown in Fig. 7. A last partially inserted in a shoe is seated on the last pin and swung downwardly and rearwardly into the substantially horizontal position shown in Fig. 1. The initial position of the horn H is such that during this movement of the last the horn will normally find its way between the last and the shoe, as shown in Figs. 1 and 9, and will maintain the last in engagement with the last pin until the roll R is raised into engagement with the sole of the shoe. The operative now arranges the shoe in suitable co-operative relation to the shoe-engaging roll R, and the treadle 34 is swung to the right in Fig. 10 to trip the Horton clutch. This rotates the shaft 68 just far enough so that cam 120 is rotated out of engagement with the cam roll 118 and bell-crank lever 110 is thereby released, whereupon the spring 112 moves the shoe-engaging roll R and its frame 108 upwardly, the cam roll 118 following the retreating surface of the cam to prevent any sudden or jarring release of the roll, until the roll engages the sole of the shoe, as shown in Fig. 9, under the heavy adjustable spring pressure provided by the spring 112. At this time the first stop 66 on the Horton clutch comes into action and the clutch is thrown out to stop the rotation of shaft 68.

The operator now depresses the treadle 34 to throw the clutch 44, causing the shoe-engaging roll to rotate and push the shoe rearwardly on the last. As previously explained, during this rearward movement of the shoe he may move the shoe-engaging roll R axially by operation of the handle 140 to cause one side of the shoe to be moved rearwardly more rapidly than the other side, thus allowing for seating shoes on very narrow and crooked lasts. Moreover, during this operation, he may manipulate the shoe relatively to the last by the use of a shoe hammer, exercising his skill and judgment in co-operation with the force exerted by the machine, to improve the seating and appearance of the shoe.

It would naturally be thought that the seating of the shoe on the last during this operation would be facilitated by urging the upper rearwardly at the same time as the sole. It is found, however, that in reality the reverse is the case and that the seating of the shoe is actually facilitated by retarding the rearward movement of the upper. This may be because the important feature of this operation is to seat the relatively unyielding sole in proper relation to the bottom of the last, and this is more easily done if the upper is not at this time stretched into its final position on the last. The upper is thereafter readily drawn into place partly by its own elasticity and partly during the pulling of the heel up into place on the last. In the case of some kinds of shoes which are difficult to seat properly, this part of the operation may be facilitated by glancing or wedging blows struck with a shoe hammer against the toe portion of the upper of the shoe during the rearward movement of the sole to urge the upper relatively forward with respect to the sole.

The toe portion of the shoe having been properly seated in this way, the treadle 34 is released, stopping the rotation of the shoe-engaging roll under power, and leaving the roll free to turn in contact with the sole of the shoe during the bodily rearward movement of the roll. It is to be noted, however, that the roll may again be rotated, if desired, at any time in the subsequent operations, by depressing the treadle 34. The Horton clutch is again tripped whereupon the frame 108 is oscillated by the bell-crank lever 126 to move the friction roll rearwardly into the successive positions shown in Figs. 3, 4 and 5. Shortly after this movement of the roll is inaugurated the bell-crank lever 224 is oscillated to reciprocate the shoe horn support 200 while at the same time the bell-crank lever 202 is oscillated, yieldingly to move the shoe horn forwardly. The resultant of these two motions is a movement of the bearing 228 in the path shown in a dotted line in Fig. 9, first rocking the shoe horn H about the heel of the last as a fulcrum against the tension of spring 230 into the position shown in Fig. 3, and then drawing it upwardly as shown in Figs. 4 and 5 to draw the counter portion of the shoe over the heel of the last. At the same time the rearwardly moving roll progressively forces the sole of the shoe against the last, materially aiding the horn in seating the heel portion of the shoe on the last, while simultaneously leveling the sole against, and conforming it to the shape of, the last. The shoe horn is moved upwardly far enough to withdraw it from the shoe and the reciprocation of the support 200 stops just before the abutment 232 thereon engages the abutment 162 to release the latch holding the last pin. During the latter part of this movement of the shoe horn the roll R moves forwardly into the shank of the shoe as shown in Fig. 6 whereupon the Horton clutch is thrown out and the machine comes to rest.

As the shoe is now held under heavy pressure of from 200 to 500 pounds, which shapes the shank firmly into engagement with the last, this is a very good time to secure the upper portions of the shoe about the last. This operation is usually performed by inserting the block B and lacing, as illustrated in Fig. 6, but it may be done in some kinds of shoes by buttoning and in pumps by tacking a protruding portion of the lining to the last. If preferred, fasteners may be used such as are disclosed in Letters Patent of the United States No. 1,496,020, granted June 3, 1924, upon application of Charles F. Pym.

The Horton clutch is now tripped for the last time during the cycle, causing the friction roll to move forwardly and downwardly to its initial position while at the same time the shoe horn support 200 moves upwardly to trip the latch 158, releasing the last pin and allowing it to carry the relasted shoe into the substantially vertical position shown in Fig. 7. The horn continues its motion downwardly to its initial position.

As has been previously pointed out, the action of the machine in pushing the shoe on the last broadens the forepart of the shoe during the relasting operation and consequently when the pushing pressure is relieved the shoe contracts by its own elasticity, and this contraction is aided by the action of the shoe horn in pulling the heel up into place on the last so that as a result the forepart of the shoe is contracted into tight engagement with the last. At the same time undue straining of the shoe after engagement of the toe of the last with the interior toe portion of the shoe is prevented by the friction and suction surface of the roll R. The frictional effect of the roll R against the shoe bottom is limited, owing to the fact that the surface portion of the roll, as previously stated, is not composed entirely of rubber but of rubber and canvas, and the force exerted by the combined friction and suction may be varied by adjusting the tension of the spring 112 so that the roll will slip as soon as the toe portion of the shoe is seated without injury to the shoe. Furthermore, the duration of the rotation of the shoe-engaging roll is under the control of the operator, who may release the treadle 34 at any time and it is often practicable to stop the roll when the seating of the toe is complete and in this way to avoid injury to the shoe. The pressure of the roll against the sole pulls the toe of the sole downward relatively to the last. In relasting a turned shoe, therefore, the last is maintained out of engagement with the toe portion of the sole, until it has passed the channel lip. Thereafter the point of the last cams against the toe of the shoe to lift the sole into engagement with the last.

It will be noted that the mounting of the shoe horn is such that its motion is almost exactly that of a manually operated shoe horn and in this respect is much superior to previous mountings in which such compound motion is not attained. The upward motion of the shoe horn is positive while the oscillation of the shoe horn support is a yielding motion through the spring 216. For this reason it is possible, without danger of damaging the shoe, to move the arm 208 of the oscillating shoe horn support slightly in excess of the required amount, whereby the shoe horn is constantly and yieldingly urged to pull the shoe rearwardly of the last about the rear top corner of the last as a fulcrum.

The above-described method of operation is claimed in my copending application No. 518,294, filed November 28, 1921, which is, as to such subject-matter, a division of this application.

While I have described in detail one form of apparatus to illustrate my invention, it will be appreciated that considerable variation in this apparatus is feasible, and it is not the intention to limit the scope of the claims in any way thereby. The term "relasting", as used in the claims, is to be understood as descriptive only, and not as limiting the invention to second lasts or turned shoes, unless such meaning is required by the context. The term "impositive", used to describe certain means recited in various claims, is intended to cover broadly the use of a friction, suction, or other surface which may slip under excessive resistance, as distinguished from a rigid or merely yielding connection, which cannot slip. It is not the intention to limit these claims, unless other specific limitations appear, to the use of such a surface directly to engage the surface of the shoe itself.

Having described my invention, what I claim as new and desire to secure by Letters Patent of the United States:—

1. In a relasting machine, a support to engage a last partially inserted in a shoe, means to engage a shoe on a last supported thereby and comprising a surface which will slip under excessive resistance, mechanism to cause relative movement between the support and the shoe-engaging means to seat the shoe on the last while simultaneously broadening the forward portion of the upper to facilitate the insertion of the last therein, and means to contract the forward portion of the upper after the seating of the last, to bring the upper into snug engagement with the last.

2. In a relasting machine, a support to hold a last stationary, means comprising a rolling surface which can slip under excessive resistance to seat the forward portion of a shoe on a last held by said support, and means to draw the rear portion of the shoe over the last.

3. In a relasting machine, in combination, a support for holding stationary a last partially inserted in a shoe, means for seating the toe portion of a shoe on a last supported thereby, and other means operable thereafter, while the last is in the same position, for positively pulling the shoe rearwardly and seating the counter portion of the shoe on the last.

4. In a relasting machine, a support to engage a last and hold it in a substantially horizontal position, means co-operating with said support completely to seat a shoe on a last engaged by said support, said support and said means being so constructed and arranged as to maintain the entire upper forward portion of the shoe and last right-side up during the seating of the shoe on the last with no portion of said support or said means overlying the shoe to enable an operator conveniently to observe and control the relasting of the shoe, and means acting upon the last support to move the last into a substantially vertical position after the shoe has been seated on the last to facilitate the removal of the last and shoe from the support.

5. In a relasting machine, a support to hold a last stationary, friction means arranged to engage a shoe forward of the shank portion thereof and to push the shoe rearwardly on a last held by said support, and means positively movable rearwardly to pull rearwardly on the shoe.

6. In a relasting machine, a support to engage a last partially inserted in a shoe, means progressively to apply pressure to the sole of a shoe to force it against a last carried by said support, and means simultaneously to seat the counter portion of the shoe on the last.

7. In a relasting machine, a support to engage a last partially inserted in a shoe, an engaging roll to seat the forepart of a shoe on a last supported thereby, and means to seat the counter portion of the shoe on the last.

8. In a relasting machine, a support to engage a last partially inserted in a shoe, means comprising a surface which can slip under excessive resistance to engage opposite marginal portions of the shoe bottom to seat the toe portion of a shoe on a last supported thereby, a shoe horn, and mechanism to move said horn to cause it to seat the counter portion of the shoe on the last.

9. In a relasting machine, a support for a last partially inserted in a shoe, a shoe horn movable in a direction to draw the counter portion of a shoe over the heel portion of a last carried by the support, and means to co-operate therewith by progessively exerting pressure on the bottom of the shoe.

10. In a relasting machine, a support for a last partially inserted in a shoe, a shoe horn to draw the counter portion of a shoe over the heel portion of a last carried by the support, and a roll movable longitudinally in constant yielding engagement with the shoe bottom, progressively to force the shoe bottom against the last during the seating of the counter portion of the shoe on the last.

11. In a relasting machine, a movable support for a last, means to seat a shoe on a last supported thereby, said support being constructed and arranged to move to withdraw the lasted shoe from said shoe-seating means at the conclusion of the relasting operation, means constantly tending to move said support, a latch normally restraining said support from movement, and means for releasing the latch.

12. In a relasting machine, a support to engage a last partially inserted in a shoe, means to engage a shoe on a last supported thereby to seat the forepart thereon, mechanism thereafter to move relatively said means and said support to press the shoe against the last, and means to co-operate with said engaging means to seat the counter portion of the shoe on the heel of the last during the relative movement of the shoe-engaging means and the last support.

13. In a relasting machine, a support for a last partially inserted in a shoe, a roll to engage the bottom of a shoe on a last supported thereby, gearing to rotate the roll in engagement with the shoe to move the shoe on to the last, a lever to move the roll bodily relatively to the shoe and in engagement therewith, and a horn to draw the counter portion of the shoe over the heel of the last during the movement of the roll.

14. In a relasting machine, in combination, last-supporting means, means to relast a shoe on a last supported thereby, power-driven mechanism to operate said relasting means, and a treadle control for said power-driven mechanism constructed and arranged to bring the power-driven mechanism to rest at an intermediate stage of the relasting operation to permit an operative more readily to direct the relasting of the shoe.

15. In a relasting machine, in combination, a support for a last partially inserted in a shoe, a roll to engage a shoe on a last supported thereby, a spring to move said roll into engagement with the shoe bottom, gearing to rotate said roll to seat the forepart of the shoe on the last, a shoe horn to draw the counter portion of the shoe on the last, a mechanically moved support for the shoe horn, and a lever to move the roll bodily rearwardly of the shoe bottom and maintained in engagement therewith by said spring to co-operate with the shoe horn in seating the counter portion of the shoe on the last.

16. In a relasting machine, a support for a last partially inserted in a shoe, and means to engage a shoe on a last supported thereby and comprising a surface which will slip under excessive pressure, said support and said means being constructed and arranged for relative movement to push the shoe on the last to cause the seating of the last in the shoe and the broadening of the forward portion of the upper of the shoe to facilitate the insertion of the last.

17. In a relasting machine, a support to hold a last stationary, and impositively engaging friction means to push a shoe rearwardly on a last held by said support.

18. In a relasting machine, a support to engage a last partly inserted in a shoe, rotary means to engage the bottom of a shoe on a last supported thereby, and mechanism to operate said means to push the shoe on the last thereby to broaden the shoe upper, facilitating the seating of the shoe on the last.

19. In a relasting machine, a support to engage a last partly inserted in a shoe, a device having a smooth surface for impositively engaging the bottom of a shoe on a last supported thereby, forwardly of the shank, and mechanism to impart movement to said device to push the shoe on the last, thereby to broaden the shoe upper, facilitating the seating of the shoe on the last.

20. In a relasting machine, a support for a last partially inserted in a shoe, a shoe-seating roll to engage on the bottom and forwardly of the shank a shoe on a last supported thereby, and gearing to rotate the roll in engagement with the shoe bottom, to push the shoe on the last, thereby simultaneously broadening the shoe upper to facilitate the seating of the shoe on the last.

21. In a relasting machine, a support for a last partially inserted in a shoe, and means to push a shoe on to a last supported thereby, said means being constructed and arranged to permit the effective direction of the shoe-moving force to be varied during the operation of the machine to twist the shoe relatively to the last.

22. In a machine of the class described, a support to engage a last partially inserted in a shoe, a roll of varying diameter to engage a shoe on a last supported thereby, said roll being movable transversely of the shoe to bring portions of different diameters into engagement with the shoe, and means for moving said roll lengthwise of the shoe.

23. In a relasting machine, a support to engage a last partially inserted in a shoe and to hold the last and shoe substantially upright, a progressively moving relasting device, and power-actuated means for operating said device to cause it to exert pressure on the bottom of a shoe during the relasting operation to force the shoe bottom upwardly against a last carried by said support.

24. In a relasting machine, a support for a last partially inserted in a shoe constructed and arranged to hold the last stationary by engagement with its rear portion only, and rotary relasting means constantly urged into engagement with the bottom of a shoe on a last supported thereby, during the relasting operation.

25. In a relasting machine, a support for a last partially inserted in a shoe constructed and arranged to hold the last stationary by engagement with its rear portion only, a relasting roll to engage the bottom of a shoe on a last supported thereby, and yielding means to urge said roll against the shoe bottom during the relasting of the shoe.

26. In a relasting machine, a support for a last partially inserted in a shoe constructed and arranged to hold the last stationary by engagement with its rear portion only, a relasting device to engage the bottom of a shoe on a last supported thereby, and yielding means to urge said device against the sole with an adjustable pressure.

27. In a relasting machine, a support for a last partially inserted in a shoe constructed and arranged to hold the last stationary by engagement with its rear portion only, means frictionally to engage a shoe on a last supported thereby, and means operable to vary the amount of the friction between said frictionally engaging means and the shoe.

28. In a relasting machine, a support for a last partially inserted in a shoe, a relasting device located opposite the bottom of a last on said support and movable lengthwise of the last between the ends thereof, to engage the bottom of a shoe on the last, yielding means to urge said device against the shoe bottom, and mechanism to hold said device out of operative engagement with the shoe bottom against the pressure of the yielding means while said device is located between the ends of the last, said mechanism being arranged to allow the yielding means to bring said device into engagement with the bottom of the shoe during the relasting operation.

29. In a relasting machine, a support for a last partially inserted in a shoe constructed and arranged to hold the last stationary by engagement with its rear portion only, a shoe-seating roll to engage a shoe on a last supported thereby, a spring urging said roll into yielding engagement with the shoe, and means to vary the pressure exerted by the spring.

30. In a relasting machine, a support for a last partially inserted in a shoe, a shoe-seating roll, a spring urging said roll into engagement with a shoe on a last carried by the support, and actuated means for forcing the roll out of engagement with the shoe while simultaneously compressing the spring.

31. In a relasting machine, a support for a last partially inserted in a shoe, a shoe-seating roll to engage a shoe on a last supported thereby, gearing to rotate said roll in engagement with the shoe, and mechanism to cause relative bodily movement of said support and said roll progressively to engage said roll along the forepart and shank of the shoe.

32. In a relasting machine, a support for a last partially inserted in a shoe, a relasting roll to engage a shoe on a last supported thereby, mechanism to rotate said roll, means bodily to move said roll along the forepart and shank of the shoe during the relasting operation, and adjustable means to limit the extent of movement of said roll.

33. In a relasting machine, means to seat the toe portion of a shoe on a last while simultaneously broadening the forward portion of the shoe upper to facilitate the insertion of the last, and means to contract the forward portion of the upper after the insertion of the last, into snug engagement therewith.

34. In a relasting machine, means to seat the toe portion of a shoe on a last while simultaneously broadening the forward portion of the shoe upper to facilitate the insertion of the last, and means to contract the forward portion of the upper after the insertion of the last, into snug engagement therewith while at the same time seating the counter portion of the shoe on the last.

35. In a relasting machine, means to seat the counter portion of a shoe on a last, and independent means movable longitudinally of and in engagement with the shoe bottom to co-operate in the operation of seating the counter portion of the shoe on the last.

36. In a relasting machine, a device constructed and arranged to cause relative movement of a last and a shoe to seat the toe of the last in the shoe, and a horn initially engageable with the bottom of the last and movable from such position to draw the heel portion of the shoe over the last, said device and said horn being relatively movable to co-operate in seating the heel portion of the shoe on the last.

37. In a relasting machine, a support for a last, a shoe horn initially positioned to engage the last bottom, mechanism to move the horn to draw the counter portion of a shoe on a last, and a device simultaneously and progressively to apply pressure to the shoe bottom to co-operate with the shoe horn in seating the counter portion of the shoe on the last.

38. In a relasting machine, means to seat the counter portion of a shoe on a last, a relasting roll, and a lever to move the roll bodily in engagement with the shoe during the seating of the counter portion of the shoe.

39. In a relasting machine, in combination, a shoe horn movable in a direction to seat the counter portion of a shoe on a last, a rotary device to rub the shoe bottom against the enclosed last, and means for rotating said device.

40. In a relasting machine, in combination, a member movable in a direction to seat a shoe on a last, and a rubbing device thereafter movable to force the shank against the enclosed last.

41. In a relasting machine, a shoe-seating roll, means for seating the counter portion of a shoe on a last, and mechanism for operating said roll alone in seating the forepart of a shoe on a last and thereafter operating both said roll and said means in seating the counter portion of the shoe on the last.

42. In a relasting machine, means for seating the counter portion of a shoe on the last, and independently operable rotary toe-seating means.

43. In a relasting machine, in combination, rubbing means for urging the toe portion of a shoe on to a last, a member movable in a direction to seat the counter portion of the shoe on the last, and mechanism to actuate said means in co-operation with said member in seating the counter portion of the shoe on the last.

44. In a relasting machine, means for seating the counter portion of a shoe on a last, and rotary means to seat the toe portion of the shoe on the last and to co-operate with the first-named means in seating the counter portion of the shoe on the last.

45. In a relasting machine, means for supporting and moving a last, means for seating the toe portion of a shoe on a last, means for seating the counter portion of the shoe on the last, mechanism for operating said first-named means, and separate mechanism for operating both said means.

46. In a machine of the class described, relasting mechanism, a movable last support, means constantly urging said support to one position, a device to maintain the support in another position in opposition to said means, and means associated with the relasting mechanism to render said device inoperative and thereby to permit a movement of a last carried by said support.

47. In a relasting machine, a support for a last movable to a plurality of positions, normally ineffective means for moving the last support, and means to act on a shoe on a last supported thereby, during the relasting operation, said means being constructed and arranged to render the first-mentioned means effective to move the support from one position to another to present the relasted shoe in a convenient position for removal from the machine.

48. In a shoe machine, a movable last pin, normally ineffective means for moving the last pin, and a movable shoe horn operating on a shoe on a last supported by the last pin, and constructed and arranged to render said means effective to move the last pin to present the relasted shoe in convenient position for removal from the machine.

49. In a machine of the class described, a last support, a spring urging said support into one position, a latch holding the support in another position, and means to operate on a shoe on a last engaged by the support and thereafter to release the latch and to permit the support carrying the shoe to be moved by the spring into the first-named position.

50. In a relasting machine, a support to engage a last partially inserted in a shoe, and means for seating the counter portion of a shoe on a last supported thereby, and constructed and arranged positively to maintain the last in engagement with said support.

51. In a relasting machine, means for seating the counter portion of a shoe on a last, and a last support formed and arranged to protect said means.

52. In a relasting machine, a movable support for a last partially inserted in a shoe, and a shoe horn normally positioned to be inserted between the bottom of a last and a shoe in which the last is partially inserted as the support is moved.

53. In a relasting machine, supporting means for a last partially inserted in a shoe, said supporting means including a last pin adapted to fit within the thimble hold of the last, and means to seat the counter portion of a shoe on a last supported by said supporting means, said supporting means and said seating means being formed and arranged to co-operate to hold the last and the shoe right-side up and unobstructed, to enable an operative to control and guide the relasting of the shoe.

54. In a relasting machine, means comprising a surface which will slip when a predetermined resistance is encountered, mechanism for operating said means to push a shoe to relatively move the shoe and its last to seat the forward portion of the last in the shoe and to broaden the shoe upper, in combination with means for actuating said first-named means to cause it to relast the toe portion of the shoe.

55. In a relasting machine, a shoe-seating roll, and a gearing to rotate said roll in engagement with a shoe forwardly of the shank and to move the roll bodily as it is rotated, to seat the toe portion of a shoe on a last while simultaneously broadening the forward portion of the shoe upper to facilitate the insertion of the last.

56. In a relasting machine, a shoe-seating roll, operator-controlled means for rotating the roll to relast a shoe, and mechanism to impart positive bodily swinging movement to said roll during the relasting of a shoe.

57. In a relasting machine, a shoe-engaging roll, means to move the roll bodily over both the forepart and shank portions of the shoe, and operator-controlled means to rotate the roll during said bodily movement to cause it to move a shoe relatively to a last during the relasting of the shoe.

58. In a relasting machine, a bearing, a shoe-engaging roll movable axially of said bearing, and means to rotate the roll about the bearing during the relasting of a shoe.

59. In a relasting machine, in combination, means to move a shoe bodily relatively to its last to seat the shoe on the last and comprising a gripping surface constructed and arranged to slip under excessive resistance, and means to vary the grip of said surface to cause slipping under different resistances.

60. In a relasting machine, means for seating the toe of a shoe on a last and for shaping the shank of the sole, a device for seating the counter portion of the shoe, mechanism to operate said means in seating the toe of the shoe, and separate mechanism to operate said means during the seating of the counter portion of the shoe.

61. In a relasting machine, a rotary device to seat the toe of a shoe on a last, means for positively rotating said device including a clutch capable of being thrown out to terminate the positive rotation of said device during the relasting operation, and mechanism for moving said device bodily relatively to the last during the seating of the counter portion of the shoe on the last.

62. In a relasting machine, a shoe-seating member for engaging a shoe partially mounted on a last, an oscillatory support for said member, a spring to press said member against the sole of a shoe during the relasting of the shoe, and means positively to oscillate said support to move said member along both the forepart and shank portions of the sole.

63. In a relasting machine, a frame, a shoe-seating roll carried by said frame to engage a shoe partially mounted on a last, a spring to move said roll into engagement with the shoe, and co-ordinated gearing to rotate said roll and also to move it bodily during the relasting of the shoe.

64. In a relasting machine, a shoe-seating roll to engage a shoe partially mounted on a last, an oscillatory carrier for said roll, means acting through said carrier to urge said roll into engagement with the shoe under yielding pressure, and means to oscillate said carrier to move said roll across both the forepart and shank portions of a sole.

65. In a relasting machine, a concave engaging roll for pushing a shoe on a last, means to hold the roll in engagement with the shoe, means for positively rotating the roll, and means acting upon said holding means to move the roll while in engagement with the shoe in a direction to vary the direction of push exerted by the roll upon the shoe.

66. In a relasting machine, a shoe-seating roll for engaging a shoe partially mounted on a last, a spring to urge said roll into engagement with the shoe, an oscillatory frame carrying said roll, and means to oscillate said frame to move said roll bodily relatively to the shoe while maintained in engagement therewith by the yielding means.

67. In a relasting machine, a concave shoe-engaging roll, a spring to urge said roll into engagement with a shoe, gearing to rotate said roll while in engagement with the shoe, a lever, and mechanism connected with said lever to move the roll axially bodily while said roll is held in engagement with the shoe by said spring.

68. In a machine of the class described, a frame, a roll carried by said frame for engagement with a shoe, gearing to rotate said roll in engagement with the shoe, stopping and starting mechanism for said gearing, a lever, and mechanism connected with said lever to move the frame bodily while said roll is maintained in engagement with the shoe, and separate stopping and starting mechanism to control the bodily movement of the roll.

69. In a machine of the class described, in combination, a roll for engagement with a shoe, an oscillatory support for said roll, gearing to rotate said roll for a length of time variable at the will of an operator, and mechanism to oscillate said support to move said roll through a definite cycle.

70. In a relasting machine, means for engaging a shoe during the relasting thereof, and mechanism to move said means to cause movement of the shoe during the relasting operation, said means being constructed and arranged to produce a different rate of linear movement at different portions of the shoe to effect change in the direction of the movement of the shoe.

71. In a relasting machine, a shoe-seating roll comprising a wear-resisting surface layer, and a cushion layer within and supporting the surface layer.

72. In a relasting machine, a movable roll to engage a shoe and cause movement thereof during the relasting of the shoe, means for moving the roll, and an adjustable abutment to limit the movement of said means.

73. In a shoe machine, suction means to engage a shoe partially inserted upon a last and move the shoe relatively to the last to seat it thereon, and mechanism to move said means, to impart movement to the shoe.

74. In a shoe machine, a movable member constructed and arranged to engage a shoe, provided with vacuum cups in its shoe-engaging surface, and means to move said member impositively to engage a shoe and cause movement thereof.

75. In a shoe machine, a support to engage a last, suction means to engage a shoe placed on the last, a movable carrier for said means, and mechanism to move relatively both said carrier and said means to move the shoe relatively to the last.

76. In a relasting machine, means to hold a last stationary, and suction means to move a shoe rearwardly on to a last held thereby during the relasting of the shoe on the last.

77. In a relasting machine, a support for a last partially inserted in a shoe, and a suction roll to engage a shoe on a last supported thereby, to move it relatively to the last during the relasting of the shoe on the last.

78. In a relasting machine, a shoe horn constructed and arranged to be inserted between a last and shoe, and mechanism for rocking said horn about the heel of the last as a fulcrum during the relasting operation, said mechanism being constructed and arranged to yield to avoid danger of damaging the shoe.

79. In a relasting machine, a shoe horn constructed and arranged to be inserted between a last and shoe, mechanism for rocking said horn about the heel of the last as a fulcrum, said mechanism being constructed and arranged to yield to avoid danger of damaging the shoe, and yielding means urging the horn against the last.

80. In a relasting machine, a shoe horn, a support therefor, means to move the support in one direction, and means simultaneously to move the support in another direction, thereby to move the support in a resultant arcuate path.

81. In a relasting machine, a shoe horn, a support therefor, yielding means to move the support in one direction, and positive means simultaneously to move the support in another direction, thereby to move the support in a resultant arcuate path.

82. In a relasting machine, a shoe horn, a support therefor, mechanism to move the shoe horn during the relasting of a shoe, and an adjustable abutment to determine the initial position of the shoe horn.

83. In a relasting machine, an oscillating support, a reciprocating carrier mounted thereon, and a shoe horn on said carrier and constructed and arranged to be moved by said support and said carrier to draw the counter portion of a shoe on to a last during the relasting of the shoe.

84. In a relasting machine, a carrier for a shoe horn, yielding means to oscillate the carrier, and positive means to reciprocate the carrier, said yielding and positive means moving the carrier to cause the shoe horn thereon to draw the counter portion of a shoe on to a last during the relasting of the shoe.

85. In a relasting machine, a shoe horn to draw the counter portion of a shoe on to a last, a support therefor comprising a two-arm lever, and an adjustable connection between the two arms of said lever to permit variation in the initial position of the shoe horn supported thereby.

86. In a relasting machine, a movable shoe horn, a member mounted to move therewith and to form with the said horn a clamping jaw, and means causing said clamping jaw to open.

87. In a relasting machine, a heel-clamping jaw movable to draw the counter portion of a shoe on to a last during the relasting of a shoe, yielding means to close said jaw on the counter portion of the shoe, and positive means to open said jaw.

88. In a shoe machine, in combination, means to push a shoe on a last to relast a shoe and to rub the shoe bottom against the enclosed last, and mechanism to actuate said means impositively so as not to injure the shoe.

89. In a machine for relatively moving lasts and shoes, in combination, a support for a last, a roll engaging the bottom of a shoe on the last and clamping it thereagainst, and means to move relatively the counter portion of the shoe and the heel end of the last while the forepart of the shoe is held stationary with respect to the last by said roll.

90. In a machine for relatively moving lasts and shoes, in combination, a support for a last, a friction roll, treadle-controlled mechanism to move the roll into yielding engagement with the forward bottom portion of a shoe on the last, and means relatively to move the counter portion of the shoe and the heel end of the last while the roll is yieldingly and immovably held against the forward portion of the shoe bottom.

91. In a relasting machine, a roll, a support for said roll, a pivotal bearing for said support, a support for said bearing, and a pivotal bearing for the second-mentioned support.

92. In a relasting machine, a roll, a support for said roll, a pivotal bearing for said support, positive means for swinging said support in one direction about said bearing, a support for said bearing, a pivotal bearing for the second-mentioned support, and yieldable means for swinging the second-mentioned support in the same direction about the second-mentioned bearing.

93. In a relasting machine, a roll, a support for said roll, means for rotating said roll in said support, a pivotal bearing for said support, a support for said bearing, and a pivotal bearing for the second-mentioned support.

94. In a machine for effecting relative movement between lasts and shoes, a roll having a frictional shoe-engaging surface, a support for said roll, a pivotal bearing for said support, a support for said bearing, and a pivotal bearing for the second-mentioned support.

95. In a machine for effecting relative movement between lasts and shoes, a roll having a frictional shoe-engaging surface, a support for said roll, a pivotal bearing for said support, positive means for swinging said support in one direction about said bearing, a support for said bearing, a pivotal bearing for the second-mentioned support, and yieldable means for swinging the second-mentioned support in the same direction about the second-mentioned bearing.

96. In a machine for effecting relative movement between lasts and shoes, a roll having a frictional shoe-engaging surface, a support for said roll, means for rotating said roll in said support, a pivotal bearing for said support, a support for said bearing, and a pivotal bearing for the second-mentioned support.

97. In a machine for relatively moving lasts and shoes, a roll having a frictional shoe-engaging surface, a pivotally mounted support for said roll, and an adjustable abutment constructed and arranged to limit the pivotal movement of said support.

98. In a machine for use in making shoes, in combination, a support for a last, and mechanism to perform a cycle of movements relatively moving the shoe and the last, said mechanism comprising a plurality of stopping and starting mechanisms, a treadle, and connections therefor such that vertical motion of the treadle will actuate one of said mechanisms and horizontal motion of the treadle will actuate another of said mechanisms.

99. A machine having, in combination, a plurality of shoe-engaging members for effecting relative movement between a shoe and its last, connections for driving each of said members in a direction to effect said relative movement, and means for independently disconnecting each of said connections.

100. In a relasting machine, power-driven means for effecting relative movement between a shoe and its last to mount the shoe on the last, and means associated with said power-driven means for limiting the amount of force applied by said power-driven means to effect said relative movement.

101. In a machine for relatively moving a shoe and its last, means including a member for effecting said relative movement, and means under control of the operator during the operation of said member for varying the position of said member to vary the direction of said relative movement at the heel end of the shoe to accommodate variations in the swing of different lasts.

102. In a relasting machine, a support for a last partially inserted in a shoe, a roll engageable with the sole of the shoe for pushing the shoe on the last, and means for varying the position of the roll to accommodate the degree of swing of different lasts.

103. In a relasting machine, a support for a last partially inserted in a shoe, a concave roll engageable with the sole of the shoe for pushing the shoe on the last, and means for varying the position of the roll to accommodate the degree of swing of different lasts.

104. A machine for operating on shoes, comprising a support for a last with a shoe thereon, and a member having a surface operable by frictional engagement with the shoe to effect relative movement between the shoe and the last, said support and said member being constructed and arranged for relative movement to vary transversely with respect to the shoe the location of the portion of the surface of said member which may engage the shoe.

105. A machine for operating on shoes, comprising a support for a last with a shoe thereon, and a friction roll operable by rotation against the shoe to move the shoe relatively to the last, said roll being mounted for axial movement to vary the location of that portion of the roll surface which may engage the shoe.

106. A machine for causing relative movement of lasts and shoes having, in combination, a last support, a roll having a yielding surface adapted frictionally to engage a shoe, means for moving the roll into and out of engagement with a shoe mounted on a last carried by the last support, and means for rotating the roll while the roll is in engagement with the shoe frictionally to move the shoe relatively to the last.

107. A machine for causing relative movement of shoes and lasts having, in combination, a last pin, a roll having a yielding surface adapted frictionally to engage a shoe, means for moving the roll into engagement with the sole of a shoe mounted on a last carried by the last pin, and gearing constructed and arranged to rotate the roll while the roll is in engagement with the shoe frictionally to move the shoe relatively to the last.

108. A machine for operating on shoes, comprising a support for a last with a shoe thereon, and a roll having a surface operable by frictional engagement with the shoe to effect relative movement between the shoe and the last, said support and said roll being constructed and arranged for relative movement to vary transversely of the shoe the location of the portion of the surface of said roll which may engage the shoe.

In testimony whereof I have signed my name to this specification.

ARTHUR F. PYM.